Figure 1:
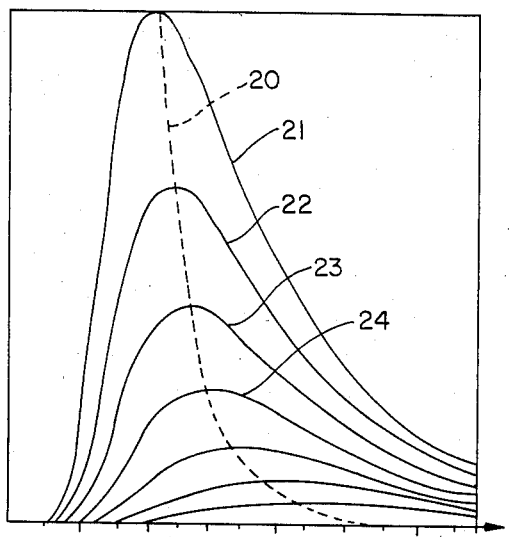

United States Patent [19]

Stenmark

[11] Patent Number: 4,605,314
[45] Date of Patent: Aug. 12, 1986

[54] SPECTRAL DISCRIMINATION PYROMETER

[76] Inventor: Lars Stenmark, Klevbergsvägen 53, S-17900 Stenhamra, Sweden

[21] Appl. No.: 569,883

[22] Filed: Jan. 11, 1984

[30] Foreign Application Priority Data

Jan. 13, 1983 [SE] Sweden ............................. 8300139

[51] Int. Cl.[4] ............................. G01J 5/24; G01J 5/26
[52] U.S. Cl. .................................... 374/127; 374/124; 374/128
[58] Field of Search ................ 374/127, 124, 128, 121

[56] References Cited

U.S. PATENT DOCUMENTS 3,222,930 12/1965 Smith .
3,474,671 10/1969 Byron .................................. 374/127
3,737,239 6/1973 Adams ................................. 250/226
4,362,057 12/1982 Gottlieb ............................... 374/111

FOREIGN PATENT DOCUMENTS 2938844 4/1981 Fed. Rep. of Germany .

Primary Examiner—Charles Frankfort
Assistant Examiner—Denis E. Corr
Attorney, Agent, or Firm—Pollock, Vande Sande & Priddy

[57] ABSTRACT

The present invention relates to a procedure and a device for determination of the temperature of an object by measurement of electromagnetic radiation emitted by this object. A portion of the radiation emitted by the object of measurement is transmitted by a transmission device to a wavelength dividing device.

The wavelength dividing device causes a portion of the spectrum of the radiation corresponding to the spectral sensitivity range of the detector or pair of detectors to be distributed across the radiation-sensitive surface of the detector or pair of detectors. The detector senses the position of the center of gravity of the illuminated spectrum which is converted by the signal processing unit to temperature information, and displayed by an output device.

Using a sole position-sensitive detector, the relative magnitude of two currents $I_1$ and $I_2$ indicates the position of the center of gravity. When two detectors are used, it is practicable to allow the detector which senses the short-wave portion of the spectrum to be a silicon detector whereas the second detector should be a germanium detector which gives a decreasing sensitivity through the use of a larger portion of the spectrum.

By sensing the position of the center of gravity of the spectrum which corresponds to the temperature instead of its peak value, the risk of sensing of false peaks is eliminated.

5 Claims, 5 Drawing Figures

U.S. Patent    Aug. 12, 1986    4,605,314

SPECTRAL DISCRIMINATION PYROMETER

The present invention relates to a procedure and a device for ascertaining the temperature of an object of measurement through detection of radiation.

A device of this kind is traditionally designated a pyrometer but consists in practice of a radiometer, the measuring results of which are not specified in Watts per square meter or an equivalent but are instead converted into what is usually referred to as equivalent black body temperature. Accordingly, it will immediately be realised that one of the more essential problems with this type of temperature measurement is that the object of measurement is virtually never a black body, but rather a grey body. Moreover, an ordinary object of measurement is usually not constantly grey within the entire spectral range which it is desired to exploit in measurement of the temperature. In practice, this implies that the emission factor is not constant over the entire frequency or wavelength band and consequently the emission does not follow a so-called Planck radiation curve. The main problem, however, is that one is not usually aware of how grey a grey body radiating surface is.

In the oldest and perhaps most classic pyrometer, the wire pyrometer, it is simply assumed that the object of measurement is equally grey as the reference wire contained in the pyrometer. This assumption frequently leads to fairly considerable measurement errors. Moreover, in this instrument use is made only of the visible portion of the spectrum, which means that only very high temperatures can be measured with this type of device.

In endeavouring to eliminate the influence of the unknown greyness in the surface of the object of measurement various attempts have been made to either be able to determine the emission factor/greyness of the surface of the object of measurement or to find methods of making the measurement independent of the emission factor, through closer spectral analysis of the spectrum of the detected radiation. In a pyrometer that exploits the whole of or at any rate the greater part of the spectrum of the emitted radiation—the so-called total radiation pyrometer—it can be illustrated that the error in the measurement will be approximately proportional to the fourth root of the quotient between the assumed emissivity and the true emissivity. It has then been assumed that the emissivity, both the assumed and the true, is constant throughout the entire spectrum. By only measuring a narrow wavelength band—the so-called colour pyrometer—the dependence of the error on the emissivity can be reduced. The problem with this is, in the first instance, its lack of sensitivity. A further known variant of the pyrometer in which an attempt has been made to reduce the influence of unknown emissivity is the so-called two-colour pyrometer which, in principle, consists of two colour pyrometers. This functions so that the radiation intensity is determined in two relatively narrow bands located in close proximity to each other. By dividing the intensity of the first band with that of the second a value is obtained from which the temperature can be calculated. If the bands are chosen sufficiently narrow and located sufficiently closely to one another, very little influence will be exerted by the emissivity factor and spectral variations in this.

The general problem with this technique is, however, that if the bands are chosen narrow the insensitivity of the instrument will be correspondingly low, which, among other things, means that it cannot be used to measure low temperatures. The object of the present invention is therefore to provide a procedure and a device for implementation of this procedure which partly permits exploitation of a large part of the emission spectrum of the test object and thus becomes sensitive and which partly makes such allowance for the spectral distribution that the measurement will be accurate even if the emissivity factor is not known. The device for implementation of the procedure according to the invention shall furthermore be made simple as regards its design.

The present invention solves these problems in the manner indicated in the appended claims. It is then assumed that the temperature of the object of measurement is to be ascertained through detection of the electromagnetic radiation evolved by this object of measurement, whereupon some practicable transmission means such as a lens, glass fiber or other optics causes a portion of the radiation evolved by the object of measurement to be transmitted to a detector unit through the intermediary of a wavelength dividing means. This detector unit may contain one or two detectors and is connected to a signal processing unit which issues a signal to a practical output means.

The invention is characterized in that the radiation captured by the transmission means is transmitted to the wavelength dividing means which causes so large a portion of the spectrum of the radiation as corresponds to the spectral sensitivity range of the detector or pair of detectors to be distributed across the radiation-sensitive surface of the detector or pair of detectors, in combination with the sole detector or pair of detectors being made to have such a design or configuration that the signals emitted contain information as to where on the detector surface the centre of gravity of the illuminating spectrum is situated, the signals being made to be transmitted to the signal processing unit which calculates from this information the temperature of the object of measurement and subsequently presents information on the temperature on or via the output means.

In contrast to prior art technique, use is made here of all of that portion of the spectrum of the received radiation to which the detector or pair of detectors is sensitive. Hereby optimum use is made of all parts of the spectrum and a very high measuring sensitivity is assured. Moreover, the influence of variations in emissivity in different parts of the spectrum with false peaks in consequence is avoided.

Since, according to the invention, the center of gravity of the captured spectrum must be determined, it is necessary in the event that a sole detector is used that this be of a position-sensitive type, i.e. emits signals containing information on the position of the center of gravity of the illuminating radiation. Such a detector usually emits two currents, the mutual magnitude of which indicates where on the detector surface the center of gravity lies.

According to the invention the determination of the center of gravity can also take place with the aid of two detectors. These should then be so disposed that they lie as close together as possible with as little distance as possible between the light-sensitive surfaces and both be connected to the signal processing unit. Although from the standpoint of simplicity the use of a sole detector is best, two detectors together can partly give a larger total detector surface which gives higher sensitivity and partly together give a larger spectral width by being of different types, for example silicone for the shorter wave-lengths and germanium for the longer wave-lengths in one and the same illuminating spectrum.

In order for the differing sensitivity to different wavelengths of the detector or pair of detectors not to influence the accuracy of the measurement results it is practicable to complement the detectors with filters having such transmission as the function of the wavelength that the spectral sensitivity of detectors with filters will be as linear as possible.

Figure 2:
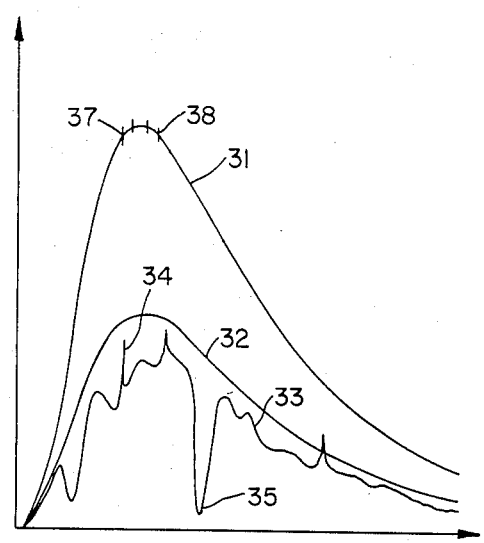
Figure 3:
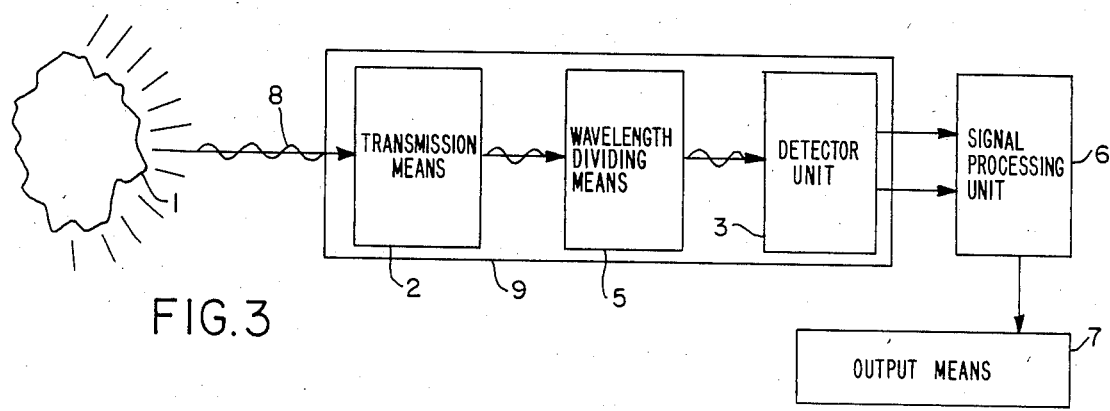
Figure 4:
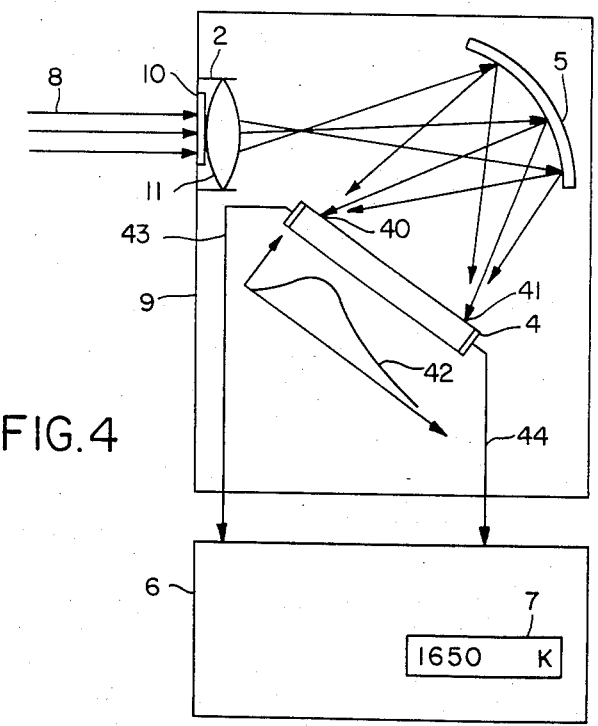

The invention is described in greater detail below and with reference to the accompanying FIGS. 1-5, where FIG. 1 illustrates the spectral distribution of black body radiation from objects with different temperature, FIG. 2 shows the spectral distribution both of an ideal black body radiator, an ideal grey body with the same temperature, and the spectral distribution of a non-ideal black or grey body radiating object, FIG. 3 illustrates a device according to the present invention in the form of a block diagram, FIG. 4 illustrates a device according to the present invention in a more detailed embodiment and FIG. 5, finally, shows a feasible radiation distribution across the detector unit in FIG. 4.

Shown in FIG. 1 in diagram form are a number of typical so-called black body radiation spectra. The X-axis of the diagram indicates in a linear scale the wave-length of the emitted radiation in micrometers in the range of 0-7 micrometers. The Y-axis of the diagram indicates in a linear scale the relative spectral radiance of the emission. The different curves 21, 22 23 and 24 show typical spectra for black body radiating objects with temperatures of 1300 K., 1200 K., 1100 K. and 1000 K. respectively. The maximum values of these curves follow the broken-line curve 20 described by Wien's Displacement Law. Since each spectrum is asymmetrically round the maximum value the center of gravity of the spectrum will, in the Figure, lie to the right of the maximum value of each respective curve. The position of the center of gravity is not described by Wien's Displacement Law. Nor is there any simple proportionality between the wavelength of the maximum values of the curves and the wave-length values of the respective center of gravity. They do, however, have one thing in common: both increase in wavelength with decreasing temperature. In all curves it has been assumed that the emission factor is one across the entire spectrum.

Shown diagramatically in FIG. 2 is the spectrum of three different objects which have been heated to the same temperature. One of these objects is an ideal black body radiator and then has an emission according to curve 31. The second object is a grey body radiator with an emission factor of 55% across the entire spectrum. The third object is a more general radiator, for example a metal smelt, and emits a radiation with the spectral distribution according to curve 33. What is typical of this more realistic spectrum is partly that the emission factor is not constant but varies with the wavelength, but partly that line and band radiation may occur, as also absorption bands in substances such as carbon dioxide and water vapour. This is particularly valid when there is a need to measure the temperature of different metal smelts where the said gases are usually formed. In two-colour pyrometers, use is made of two detectors, each of which receives its narrow band of spectrum 37 and 38 respectively, for the purpose of finding the maximum value of the emission. The maximum value is obtained when a signal of equal magnitude is received from both detectors, i.e. when the spectral bands being measured lie largely symmetrically around the top as illustrated in FIG. 2. This presupposes, however, that the emission curve actually looks like curve 31 or 32. When, however, the emission spectrum has the appearance, for example, of curve 33, i.e. contains discrete spectral lines 34, for instance from sodium or other readily energized substances, and absorption band 35 from, for example, water vapour, false maximums readily arise which do not correspond to the maximum according to Plank's Law of Radiation, and consequently this method of measurement can give rise to measurement errors. If, instead, the wavelength corresponding to the center of gravity of the emission is measured the risk of faulty measurement will be smaller. We have also been able to establish through measurements that the position of the center of gravity for a certain temperature is also very little dependent on the emission factor. If the emission factor is 1 or 0.1 across the entire spectrum, the center of gravity of the spectrum nevertheless lies on one and the same wavelength, which is a very important advantage for the procedure according to the present invention.

The measurement principle according to the present invention is illustrated in the form of a block diagram in FIG. 3. Emanating from a hot object of measurement 1 is electromagnetic radiation, of which one portion 8 is received by a transmission means 2. This transmission means may consists of a system of lenses or mirrors and/or glass fiber or glass fiber bundle, which transmits the received radiation to a wavelength dividing means 5. The task of this wavelength dividing means is to divide the accepted radiation 8 into its entire spectrum and to distribute this spectrum across the radiation-sensitive surface of a detector unit 3. The detector 4 or the detectors 14, 15 (FIG. 5) in this detector unit 3 are connected to a signal processing unit 6 which calculates the temperature of the object of measurement from the signal emitted by the detector unit and presents this on or via an output means 7.

Shown in FIG. 4 is a preferred embodiment of the device according to the present invention. For reasons of surveillability, the shown device for implementation of the procedure according to the invention has been divided into two units, one optic unit 9 and one electric unit 6, 7. The optic unit 9 contains transmission means 2 which may consist of one or a plurality of lenses 10, 11 and which transmits a portion of the emitted radiation 8 from an object 1 (not shown) to a wavelength dividing means 5 which preferably consists of a holographic concave lattice, which focuses a spectrum of the first order on a detector 4. The most short-wave radiation 40 of the spectrum will then be focused in one end of the detector 4 and the most long-wave radiation 41 of the spectrum will be focused in the other end of the detector 4. The center of gravity of the illuminating spectrum 42 will be sited somewhere on the detector surface between the end positions 40 and 41, depending on the temperature of the object of measurement. The detector 4, which is connected to signal processing unit 6 by means of connections 43 and 44, emits two currents ($I_1$ and $I_2$ respectively in FIG. 5) the relative ratio of which indicates where on the detector surface the center of gravity is situated. The position of the center of gravity corresponds directly to the temperature of the object of measurement. Through this design of a pyrometer the advantage is obtained that no moving parts whatsoever are required and the construction is very simple and inexpensive, which is largely a reflection of the choice of detector. Since the detector is of semiconductor type its response is extremely swift and the time constant of the instrument is determined entirely by the speed of the signal processing unit 6 and is, in principle, of the order of magnitude of micro- or possibly milliseconds. Further, there is no need for any expensive linear detector matrix with electronic scanning or other costly or complicated technique.

The presentation of the tempurature as calculated by signal processing unit 6 can take place either on a alpha-numerical screen constituting output means 7 or in the form of a diagram on a recorder (not shown) if the temperature to be measured varies with time, such as for example a plate rolled in a rolling mill.

Figure 5:
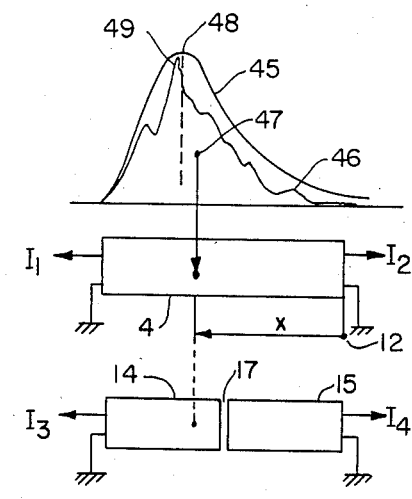

Shown in FIG. 5 are two examples of detector arrangements. By making use of a sole detector with a long narrow shape of its radiation surface, the most simple design of an instrument for implementation of the procedure according to the present invention will be obtained. The size of the detector is determined in view of the geometrical extent of the spectrum which, in its turn, is determined by the properties of the lattice 5. Since all semiconductor detectors have a non-linear spectral response, it is necessary in order to assure full accuracy that some form of compensation for this be introduced. This may appropriately occur in that detector 4, 14, 15 is complemented with one or a plurality of optic filters (not shown) which, in principle, can be sited anywhere in the path of the beam.

The spectra 45 and 46 shown in FIG. 5 thus illuminate the detector 4. Spectrum 45 is an ideal spectrum whereas 46 is a more realistic spectrum. Their centers of gravities largely coincide and have been designated with reference numeral 47 and correspond to a larger wavelength than the maximums 48 and 49 respectively of the curves. The position of the center of gravity is sensed in that the currents $I^1$ and $I_2$ emitted by the detector 4 will be of different magnitudes. By allowing for the quotient, difference and sum of the currents an accurate position value can be ascertained. This can be related to a practicable origin 12, 17 for further calculation of the corresponding temperature of the object of measurement.

The primary advantage of using two detectors is that these can then be chosen of different types. In this context it is practicable to use as detector 14 for the short-wave portion of spectrum 45, 46 a silicon detector equipped with a suitable filter and to use as detector 15 for the long-wave portion of the same spectrum 45, 46 a germanium detector, also fitted with a practicable filter. The temperature of the object of measurement is calculated in a corresponding manner from the relative ration of currents $I_3$ and $I_4$ respectively of the two detectors 14, 15. The sensitivity can be increased by using two detectors.

Instead of using optical filters for compensation of the spectral non-linearity of the detector or detectors this function can be incorporated in the function of the signal processing unit which, however, usually leads to a more expensive alternative.

I claim:

1. A device for determining the temperature of a body by detecting the electromagnetic radiation emitted by said body, said device comprising:
   a transmission means for transmitting the radiation from said body,
   a wavelength separating means for receiving said radiation from said transmission means and spectrally separating said radiation according to wave length in a distribution of intensities having a center of gravity at a particular wave length,
   a detector unit including a detector said detector receiving said spectrally separated radiation,
   a signal processing unit for receiving an output signal from said detector and converting said signal into a temperature information,
   an output means connected to the output of said signal processing unit for receiving and displaying said temperature information,
   wherein said detector comprises a single linear position sensing detector cell having outputs with sensitivity suitable for receiving and processing said spectrally separated radiation transmitted by said transmission means as a function of distribution about said center gravity, and responsive within the intended range of temperature measurement, and wherein said transmission means, said detector and said separating means are fixed in position with respect to each other.

2. A device according to claim 1, wherein said transmission means consists of a glass fiber, having a distal end, said wavelength separating means comprises a prism, wherein said end is positioned with respect to said prism so that the radiation emitted from said fiber illuminated the entire surface of said prism.

3. A device according to claim 2, wherein said wavelength separating means comprises a concave grating arranged to focus the radiation onto said detector cell.

4. A device according to claim 1 wherein from the sum, difference and/or quotient of said position-sensing detector cell outputs said signal processing unit is arranged to calculate the position of the center of gravity of the incident radiation which position is related to the temperature of said body.

5. A device according to claims 2 or 3 wherein from the sum, difference and/or quotient the position-sensing detector cell outputs said signal processing unit is arranged to calculate the position of the center of gravity of the incident radiation which position is related the temperature of said body.

* * * * *